United States Patent [19]

Bailey et al.

[11] Patent Number: 5,089,209
[45] Date of Patent: Feb. 18, 1992

[54] METHOD OF EXTRUSION BLOW-MOLDING POLYPHENYLENE SULFIDE ARTICLES

[75] Inventors: Fay W. Bailey, Bartlesville, Okla.; Charles L. Ryan, Jr., Plainsboro, N.J.

[73] Assignee: Phillips Petroleum Company, Bartlesville, Okla.

[21] Appl. No.: 628,922

[22] Filed: Dec. 6, 1990

Related U.S. Application Data

[63] Continuation of Ser. No. 332,025, Apr. 3, 1989, abandoned.

[51] Int. Cl.$^5$ ............................................. B29C 39/02
[52] U.S. Cl. ................................. 264/540; 214/331.11
[58] Field of Search ............................. 264/540, 331.11

[56] References Cited

U.S. PATENT DOCUMENTS

| | | | |
|---|---|---|---|
| 3,354,129 | 11/1967 | Edmonds, Jr. et al. | 260/79 |
| 3,711,438 | 1/1973 | Susuki et al. | 260/41 R |
| 3,919,177 | 11/1975 | Campbell | 260/79.1 |
| 4,038,261 | 7/1977 | Crouch et al. | |
| 4,261,473 | 4/1981 | Yamada et al. | 215/1 C |
| 4,405,767 | 9/1983 | Beever et al. | 525/537 |
| 4,490,522 | 12/1984 | Kawabata et al. | 528/224 |
| 4,503,168 | 3/1985 | Hartsing, Jr. | 525/436 |
| 4,510,297 | 4/1985 | Moberly | 525/537 |
| 4,652,602 | 3/1987 | Liu | 524/449 |
| 4,734,470 | 3/1988 | Kawabata et al. | 525/537 |
| 4,801,416 | 1/1989 | Kobayashi et al. | 525/537 |
| 4,820,759 | 4/1989 | Ichikawa et al. | 525/500 |
| 4,826,906 | 5/1989 | Satake et al. | |
| 4,863,669 | 9/1989 | Kouyama et al. | 264/332 |

FOREIGN PATENT DOCUMENTS 201851 11/1986 European Pat. Off. .
288308 10/1988 European Pat. Off. .
79233 6/1980 Japan .

OTHER PUBLICATIONS

Database WPIL, AN=86-002996 Derwent Publications Ltd., London, GB & JP-A-60228235 (Kuraray KK).

Primary Examiner—Melvyn I. Marquis
Assistant Examiner—Helen F. Lee
Attorney, Agent, or Firm—Laney, Dougherty, Hessin & Beavers

[57] ABSTRACT

Articles are blow-molded from a polyphenylene sulfide resin having a melt flow in a range of from about 1 to about 10 g/10 min., and preferably in a range of from about 4 to about 8 g/10 min. When filler materials such as mica are added, the upper end of the acceptable melt flow range is raised to about 15 g/10 min. By maintaining mold temperatures in a range of from about 250° to about 400° F., and preferably from about 275° to about 325° F., the polyphenylene sulfide material in the blow-molded article is provided with a semi-crystalline structure, and is dimensionally stable at temperatures of at least 500° F. Filler materials are preferably provided in a range of from about 10 to about 20 weight percent.

23 Claims, No Drawings

METHOD OF EXTRUSION BLOW-MOLDING POLYPHENYLENE SULFIDE ARTICLES

This is a continuation of copending application Ser. No. 07/332,025 filed on Apr. 3, 1989, now abandoned.

BACKGROUND OF THE INVENTION

1. Field Of The Invention

The present invention relates generally to the blow-molding of articles from thermoplastic materials, and to resins used in such processes and articles produced by such processes.

2. Description Of The Prior Art

Extrusion blow-molding is a well known technique for production of hollow thermoplastic articles. It involves placing an extruded tube, called a parison, of the thermoplastic in a mold and applying sufficient air pressure to the inside of the tube to cause it to take on the conformation of the mold. Polyethylene is usually used but a number of other materials are adaptable to this method, e.g., cellulosics, nylons, polypropylene, and polycarbonates. It is an economically efficient process and is especially suitable for production of toys, bottles, and other containers as well as air conditioning ducts and various industrial items. The method is not limited to hollow products. For example, housings can be made by blowing a unit and sawing it along the parting line to make two housings.

U.S. Pat. No. 4,261,473 to Yamada et al. discloses a process by which plastic bottles are draw-blow-molded wherein a blend of polymers is used. Among the thermoplastic resins said to be used are polyethylene, polypropylene, polytetrafluoroethylene, polyphenylene oxide and polysulfones.

U.S. Pat. No. 3,711,438 discloses the use of various fillers for thermoplastic resins subjected to various forms of molding including blow-molding.

U.S. Pat. No. 4,652,602 to Liu discloses polycarbonate resins containing mica and/or glass fiber fillers for blow-molding.

The preferred polymer used in the present invention, polyphenylene sulfide, is known, but it has not previously been successfully blow-molded to our knowledge.

Polyphenylene sulfide is commercially available from Phillips Petroleum Company of Bartlesville, Oklahoma, the assignee of the present invention, under the trademark RYTON®. RYTON® brand polyphenylene sulfide is marketed in a pelletized form for use in injection-molding and typically has a melt flow, determined in a manner described below, in a range of from about 50 to about 200 g/10 min.

SUMMARY OF THE INVENTION

Articles are extrusion blow-molded from a polyphenylene sulfide resin having a melt flow in a range of from about 1 to about 10 g/10 min., and preferably in a range of from about 4 to about 8 g/10 min. When filler materials such as mica are added, the upper end of the acceptable melt flow range is raised to about 15 g/10 min. By maintaining mold temperatures in a range of from about 250° F. to about 400° F., the polyphenylene sulfide material in the blow-molded article is provided with a semi-crystalline structure, and is dimensionally stable at temperatures of at least 500° F. Filler materials are preferably provided in a range of from about 10 to about 20 weight percent.

Numerous objects, features and advantages of the present invention will be readily apparent to those skilled in the art upon a reading of the following disclosure.

DETAILED DESCRIPTION OF THE PREFERRED EMBODIMENTS

Polyphenylene sulfide is a member of the family of aromatic sulfide polymers generally known as polyarylene sulfides. Polyarylene sulfides have the general formula $(Ar-X-Ar-S)_n$. The aromatic unit may be a mono- or polycyclic moiety and X may be selected from at least one of the groups O, S, $SO_2$, CO, OCO, NCHO, etc. In general, these polymers are noted for their excellent chemical resistance, good thermal stability and physical strength.

These polyarylene sulfides are generally manufactured by the processes disclosed in U.S. Pat. No. 3,354,129 to Edmonds, et al., and U.S. Pat. No. 3,919,177 to Campbell, both assigned to the assignee of the present invention.

Polyphenylene sulfide is the simplest member of the polyarylene sulfide family and consists of a polymer backbone of alternating disubstituted aromatic rings and divalent sulphur atoms. Polyphenylene sulfide is a commercial engineering thermoplastic resin that is semicrystalline in nature with a glass transition temperature of 85° C. and a crystalline melting point of 285° C.

Polyphenylene sulfide is characterized as having good thermal stability, corrosion resistance and physical strength.

Polyphenylene sulfide is sold commercially by Phillips Petroleum Company, the assignee of the present invention, under the trademark RYTON®. Polyphenylene sulfide as marketed by the assignee of the present invention typically has a melt flow in the range of from about 50 to about 200 g/10 min. Polyphenylene sulfide has not previously been used for or sold for the purpose of blow-molding of articles.

Although several different thermoplastic materials have previously been successfully blow-molded, some others are not suitable for such processing. Prior to the present invention, it was not known whether polyphenylene sulfide could be satisfactorily blow-molded, or if so what forms of resins and what methods of processing would be most suitable.

We have determined that polyphenylene sulfide can be successfully extrusion blow-molded if a suitable resin is chosen and processed in an appropriate manner.

When utilized without any substantial amount of filler material, the polyphenylene sulfide resin should have a melt flow in the range of from about 1 to about 10 g/10 min. when measured in accordance with test method ASTM D 1238 at 600° F. (316° C.) using a five kilogram weight (procedure B, condition 315/5.0). More preferably, the resin should have a melt flow in the range of from about 4 to about 8 g/10 min. As used herein, the melt flow parameters specified are intended to be measured by the test method set forth above.

The blow-molding process is preferably performed at a mold temperature sufficient so that the polyphenylene sulfide material in the resulting article has a semicrystalline structure. This can be accomplished by maintaining the mold temperature in the range of from about 250° F. to about 400° F., and preferably at a temperature in the range of from about 275° F. to about 325° F. This allows the polyphenylene sulfide material in the resulting article to slowly cool and substantially crystallize so that the resulting material is semi-crystalline containing for example approximately 40% to 50% crystalline material as determined by density measurement methods. If the polyphenylene sulfide is blow-molded with a cold mold, e.g., 75° F., the resin will cool too quickly and be substantially amorphous in nature and will not have suitable dimensional stability at high temperatures. The semi-crystalline polyphenylene sulfide produced by the preferred method of blow-molding with a heated mold retains its dimensional stability to temperatures of at least 500° F.

Sometimes, however, an amorphous material may be preferred. The amorphous material may be desirable due to its substantial degree of transparency which allows fluids to be viewed through the material. Also, the amorphous material is less brittle and has greater impact resistance. To produce an amorphous material the mold temperature should be maintained below about 180° F. Such amorphous materials will be dimensionally stable up to about 180° F.

Additionally extrusion blow-molding can be satisfactorily performed utilizing polyphenylene sulfide resins including a filler material in a proportion sufficient to reinforce the resin matrix thus increasing the stiffness of the resin and permitting thinner walled articles to be blow-molded as compared to those that can be made with unfilled resin.

Suitable filler materials include mica, fiberglass, silica, calcium carbonate, titanium dioxide, and talc.

Additionally, pigments, lubricants, antistats, etc., can also be incorporated into the polyphenylene sulfide resin. The total amounts of these materials will depend upon the type of article being blow-molded and the conditions used to blow-mold. Normally, the amount of filler plus other additives will vary from about zero to about 25 weight percent of the total polyphenylene sulfide resin composition.

A preferred filler material is mica. The filler materials, and especially the mica filler materials, are preferably present in the range of from about 10 to about 20 weight percent of the resin.

When utilizing filled resins, as just described, the polyphenylene sulfide resin prior to addition of the filler can have a higher melt flow than that specified above for unfilled resin. When a suitable amount of reinforcing filler is to be added, the melt flow of the polyphenylene sulfide resin prior to adding the filler can be as high as about 15 g/10 min.

An amount of filler material suitable to satisfactorily reinforce the polyphenylene sulfide resin so as to make it blow-moldable for melt flows for the unfilled resin of up to about 15 g/10 min. is generally referred to herein as a "reinforcing portion" of filler.

By utilizing resins, either filled or unfilled, having a melt flow in the ranges specified, thermoplastic articles can be satisfactorily extrusion blow-molded. The resin has sufficient stiffness to provide a suitable hang time for the parison in the blow-molding apparatus.

As is further specified in the examples set forth below, the ranges of preferred melt flow for the polyphenylene sulfide resins were determined based upon data gathered when blow-molding 16-ounce bottles. It should be noted that in any particular extrusion low-molding project, the required stiffness of the thermoplastic resin from which the parison is formed in the blow-molding machine may vary depending upon the specific machinery and particularly depending upon the size of the article to be molded. Generally speaking, for larger articles, the resin must have a higher stiffness so as to provide a longer hang time for the parison as the mold is closed and air is injected into the parison to conform it to the shape of the mold.

When resins are utilized having melt flow properties substantially greater than the preferred ranges specified above, it will generally be experienced that the resins are too liquid and do not have the necessary stiffness to maintain the shape of the parison as the mold is closed upon it. As a result, those resins generally cannot be satisfactorily extrusion blow-molded.

Polyphenylene sulfide resins having the preferred relatively low melt flow properties, and the corresponding higher molecular weights, can be generated by processes which either increase the cross linking of the polymers, or by processes which provide relatively long linear chains in order to achieve the higher molecular weights and lower melt factors desired. The polyphenylene sulfide polymer of sufficiently low melt flow can be prepared by addition of trichlorobenzene with dichlorobenzene during polymerization or curing the polymer in air at elevated temperature or a combination of both as described in U.S. Pat. Nos. 3,354,129 and 3,919,177.

The following examples illustrate the methods of the invention and the articles produced thereby.

EXAMPLE

This example describes the general procedure used to extrusion blow-mold bottles and evaluate poly(p-phenylene sulfide) resins hereinafter referred to as PPS. The example illustrates that satisfactory extrusion blow-molded PPS bottles are best obtainable only when the PPS is to be used has a melt flow property within a prescribed range. The procedure is as follows: unfilled PPS (melt flow 8 g/10 min. measured in accordance with test method ASTM D 1238 at 600° F. (316° C.) using a 5 kilogram weight [procedure B, condition 315/5.0]) was extruded through a Davis Standard extruder at 600° F. (316° C.), ground into a granular (pellet) or coarse powder and dried in a 350° F. (177° C.) oven for at least three hours. The dried PPS pellets were then blow-molded into 16-ounce capacity bottles (170 millimeters ×63 millimeters, wall thickness 0.38 millimeters, approximately 35 grams weight) using a Krupp-Kautex extrusion low-molding machine under the following conditions: Barrel temperatures, 580° F. zone 1, 590° F. zone 2, 582° F. zone 3, 582° F. zone 4, 582° F. die; 542° F. PPS melt temperature at die; 300° F. mold temperature; 40 rpm screw speed; 1200–1400 pounds per square inch extrusion pressure; 27.7 seconds cycle time; and tooling, 16 millimeter pin, 18 millimeter bushing. In this manner PPS bottles having a shiny smooth exterior surface could be made. The process was repeated several times but using a PPS sample with a different melt flow. The results from all these runs are listed in Table I and show that PPS with a melt flow between 4.3 (run 6) and 8 (run 4) give satisfactory blow-molded bottles. PPS with a melt flow of about 15 and above (runs 1 to 3) could not be blow-molded into satisfactory bottles. Presumably, the melt strength was too low. In runs 7 and 8, PPS containing 15 weight percent mica was blow-molded into satisfactory bottles.

The PPS polymer with or without mica filler was further evaluated by molding into test specimens, 5 inches ×1 inch ×0.125 inch using an Arburg injection molding machine (barrel 608° F., mold 122° F.). These results are also listed in Table I and, as might be expected, the density and tensile modulus of bottles containing mica was higher than bottles without mica. Likewise, the impact strength of the mica-filled PPS bottles was significantly lower than those bottles not containing mica. In addition, the tensile strength (yield and break) increases as the melt flow of the PPS decreases.

TABLE I

Blow-Molded Polyphenylene Sulfide Bottles[a]-Effect of Melt Flow

| No. | Flow[b] g/10 min. | Mold[c] Temp. °F. | Av. Wt., g | Appearance & Comments | Drop-Impact cm-Kg/mm | Den.[e] g/cc | Ten. Mod.,[e] MPa | Ten. Yield,[e] MPa | Ten. Break,[e] MPa | % Elongation[e] Yield | % Elongation[e] Break |
|---|---|---|---|---|---|---|---|---|---|---|---|
| 1 | 97 | 73–300 | | | | | | | | | |
| 2 | 38 | 73–300 | | Could not blow bottles. Melt strength too low. | | | | | | | |
| 3 | 15 | 73–300 | | | | | | | | | |
| 4 | 8 | 73[c] | 35.1 | Shiny/Smooth | 67 | 1.3058 | 677 | 43.3 | 23.8 | 6.1 | 15.4 |
| 5 | 8 | 300 | 35.3 | " | 79 | 1.3568 | 728 | 48.0 | 50.3 | 6.9 | 22.8 |
| 6 | 4.3 | 300 | 37.3 | " | 55 | 1.3551 | 611 | 78.9 | 59.3 | 8.3 | 14.1 |
| 7 | 7.4[d] | 300 | 30.4 | Shiny/Rough | 11 | 1.4264 | 842 | 37.6 | 39.6 | 3.7 | 3.7 |
| 8 | 6.0[d] | 300 | 31.5 | Shiny/Rough | 8 | 1.3936 | 817 | 48.8 | 48.8 | 5.6 | 5.6 |

[a]Bottles 170 mm × 63 mm, capacity 16 oz.
[b]ASTM D 1238-70, modified to a temperature of 600° F. (316° C.) using a 5-kg weight, and expressed as g/10 min. (procedure B, condition 315/5.0)
[c]Mold temp. of 73° F. gave amorphous bottles whereas mold temp. of 300° F. gave semi-crystalline bottles.
[d]Contains 15 wt. % mica.
[e]Density measured according to test method ASTM D 1505. Tensile modulus, yield, break and elongation measured according to ASTM D 638.

As is apparent from Table I, the mica-filled polyphenylene sulfide bottles in runs 7 and 8 have about a 20% higher stiffness (as measured by tensile modulus), than the unfilled polyphenylene sulfide resins and therefore can produce thinner walled bottles for equivalent stiffness.

Thus it is seen that the methods and articles of the present invention readily achieve the ends and advantages mentioned as well as those inherent therein. While certain preferred embodiments of the invention have been described for purposes of the present disclosure, numerous changes in the methods and articles may be made by those skilled in the art which changes are encompassed within the scope and spirit of the present invention as defined by the appended claims.

What is claimed is:

1. A method of forming a thermoplastic article, comprising extrusion blow-molding said article from a polyphenylene sulfide resin having a melt flow in a range of from about 1 to about 10 g/10 min.

2. The method of claim 1, wherein said resin has a melt flow in a range of from about 4 to about 8 g/10 min.

3. The method of claim 1, wherein said blow-molding is performed at a mold temperature sufficient that the polyphenylene sulfide material in said blow-molded article has a semi-crystalline structure.

4. The method of claim 3, wherein said mold temperature is in a range of from about 250° F. to about 400° F.

5. The method of claim 4, wherein said mold temperature is in a range of from about 275° F. to about 325° F.

6. The method of claim 3, wherein said blow-molded article is dimensionally stable at temperatures of at least 500° F.

7. The method of claim 1, wherein said polyphenylene sulfide resin includes a reinforcing filler.

8. The method of claim 7, wherein said filler is mica.

9. The method of claim 8, wherein said mica filler is present in said resin in a range of from about 10 to about 20 weight %.

10. The method of claim 1, wherein said blow-molding is performed at a mold temperature low enough that the polyphenylene sulfide material in said blow-molded article has an amorphous structure and has a significant degree of transparency.

11. The method of claim 10, wherein said mold temperature is no greater than about 180° F.

12. A method of forming a thermoplastic article, comprising extrusion blow-molding said article from a polyphenylene sulfide resin including a reinforcing portion of filler, said resin having a melt flow in a range of from about 1 to about 15 g/10 min. before adding said filler.

13. The method of claim 12, wherein said filler is mica.

14. The method of claim 13, wherein said reinforcing portion of mica filler is in a range of from about 10 to about 20 weight %.

15. The method of claim 12, wherein said resin has a melt flow in a range of from about 4 to about 8 g/10 min. before adding said filler.

16. The method of claim 12, wherein said blow-molding is performed at a mold temperature sufficient that the polyphenylene sulfide material in said blow-molded article has a semi-crystalline structure.

17. The method of claim 16, wherein said mold temperature is in a range of from about 250° F. to about 400° F.

18. The method of claim 17, wherein said mold temperature is in a range of from about 275° F. to about 325° F.

19. The method of claim 16, wherein said blow-molded article is dimensionally stable at temperatures of at least 500° F.

20. The method of claim 12, wherein said blow-molding is performed at a mold temperature low enough that the polyphenylene sulfide material in said blow-molded article has an amorphous structure and has a significant degree of transparency.

21. The method of claim 20, wherein said mold temperature is no greater than about 180° F.

22. The method of claim 1, wherein said polyphenylene sulfide resin is a cross-linked resin and is sufficiently cross linked to provide said melt flow range.

23. The method of claim 12, wherein said polyphenylene sulfide resin is a cross-linked resin and is sufficiently cross linked to provide said melt flow range.

* * * * *